No. 28,611.
PATENTED JUNE 5, 1860.
G. SCOTT.
MOLD FOR JARS.
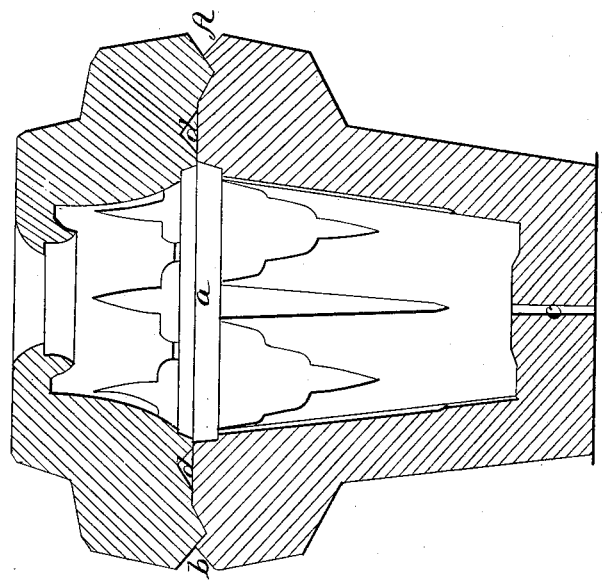
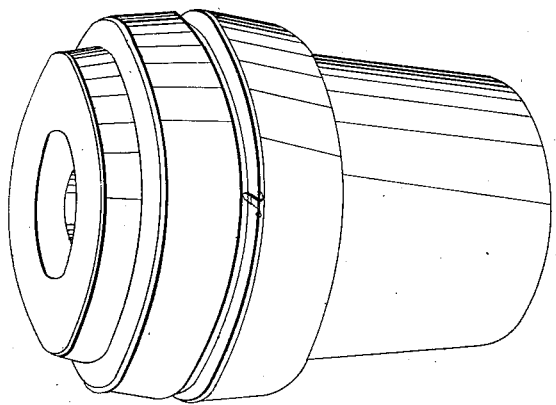
Witnesses:
Wm Clough
Charles L. Fisher
Inventor,
George Scott

UNITED STATES PATENT OFFICE.

GEORGE SCOTT, OF CINCINNATI, OHIO.

MOLD FOR JARS.

Specification of Letters Patent No. 28,611, dated June 5, 1860.

*To all whom it may concern:*

Be it known that I, GEORGE SCOTT, of Cincinnati, in the county of Hamilton and State of Ohio, have invented a new and useful Improvement in Molds for Jars; and I do hereby declare that the following is a full and complete description thereof, reference being had to the accompanying drawings, and letters of reference marked thereon, making a part of this specification.

My improvement relates to molds for a class of earthen ware vessels in which the mouth or opening in the top of the vessel, and the outer circumference thereof is of a less diameter than some part of the body of the vessel, and not to a class of vessels which have a uniform diameter, or to those which have a gradually enlarging area from the bottom toward the top, such as the common flower pot and vessels of like outer form, and in using the term "jars" throughout this specification I desire to be understood as referring invariably to the above named class of narrow mouthed vessels.

My invention consists in making molds for molding jars in two parts, each part of which is adapted to be rotated on the potters' wheel or lathe, separately, while its part of the jar is being formed upon its inner surface, substantially as hereinafter described.

In the accompanying drawings Figure 1 is a perspective view of an entire mold such as is employed by me. Fig. 2 is a vertical section of the same by an axial plane.

Partly inclosed within the sectional mold is represented a fruit jar such as this mold is designed to be used in forming. The mold is formed of plaster of paris and is made of considerable thickness to absorb the water from the plastic clay when the same has been formed into a jar upon its inner surface, as will be described. The molds have an enlargement, as shown in the drawings, upon their outer surface extending around the body of the mold and for short distance each way from the line A or dividing line between the two parts of the mold hereafter to be described.

The mold has an internal form of the precise shape and size desired for the jar which it is to be employed in forming. It may also have upon its inner surface designs or ornaments to be reproduced upon the surface of the jar such as (*o' o*) seen upon the exposed surface of the jar in Fig. 2. The mold is divided transversely into two parts, upon the line A corresponding with the point of greatest internal diameter.

The two parts of the mold are marked, the upper one, or that which corresponds with the upper part of the jar (1) and the lower one or that which corresponds with the lower part of the jar (2). When the two parts of the mold are placed together appropriately, an annular V shaped projection (*b*) formed upon the uniting surface of part (1) enters a corresponding recess in the uniting surface of part (2), causing the two to unite concentrically and retaining them thus while united.

(*d*) is an annular V shaped groove formed in the uniting surface of part one within the circle of the above named V shaped projection (*b*). It will be again referred to.

Through the bottom of part (2) is a small vent (*c*) for the escape of air from the mold in the process of molding to be described. The upper end of part (1) and the lower end of part (2) are turned or formed for a short distance to the same outer diameter, and this outer circle is nicely concentric with the circles of the respective inner spaces. The purpose of this will hereafter be seen.

Part (1) has an opening (*f*) at the upper end, corresponding with the opening in the upper end of the jar, and this opening should be left as large as the mouth of the jar to be formed in the mold will admit. At the point (*a*) where the two parts of the mold unite, there is a slight internal annular enlargement of the mold, which affords the bead (*a*) surrounding the jar, giving greater thickness of material at this point in the jar, it being the line where the clay composing the upper and lower parts of the jar are united, as will be explained.

The potters' wheel consists of a disk secured to the upper end of a vertical shaft or spindle, having a rotary motion produced in a variety of ways by the operator or an assistant. For the purpose of molding jars by my improved molds the disk or jigger head as it is usually called, which ordinarily consists of a mass of plaster of paris, is provided with a round central recess or space of the precise diameter of the outer part of the extreme ends of the molds, that is, of the part (*g*) of part (1) and the part (*h*) of part (2), so that these may be introduced or "chucked" in said recesses, and find a perfect central adjustment to the motion of the apparatus therein. The recess being central with the motion of the disk, and the inner circle of the mold being concentric with the outer, as has been described, the mold or either part thereof when inserted into the recess in the disk or head and rotated with the same, the inner surface thereof will rotate centrally.

The molds and rotating disk having now been described I will proceed to describe the process of molding jars by the use of my improved molds. A part of the mold, say part one (1), is first taken, and its appropriate end introduced into the central recess in the disk, where it should fit centrally and nicely as has been explained. The wide open part of the part which is employed, corresponding with the outer diameter of the largest part of the jar which is to be formed, displaying upwardly and outwardly. Next a portion of clay prepared as for molding jars by the common mode is taken, and having been flattened out into a broad thick sheet, it is laid over the broad open mouth of the part of the mold which had been taken for use. The amount of clay employed should be enough according to the discretion of the operator to form the part of the jar which appertains to the part of the mold which is being used.

Having placed the clay upon the mouth of the mold, the disk is put in motion by the operator or his assistant, the operator at the same time holding in one hand a sponge saturated with water with which he presses gently upon the sheet of clay downwardly toward the bottom of the mold and outwardly toward the inner surface or sides thereof, gradually increasing the pressure and extending and spreading the sheet of clay over the entire inner surface of the mold, or part thereof which is being employed. The clay having been thus evenly and nicely molded over the inner surface of the part (1) of the mold the disk is stopped, the part of the mold with its contained part of a jar is removed from its place in the central recess and set near at hand for after use in completing the entire jar. Part (2) of the mold is now taken and its appropriate part introduced into the central recess as had been done with part one (1). Another suitable lump of clay is taken and having been extended into a broad sheet is placed as before over the upwardly displayed mouth of the part of the mold now being used. The disk is again set in motion and the operator with a sponge saturated with water again applies it to the broad sheet of clay, now revolving with the revolving disk and mold, causing it to be extended downwardly and outwardly as before, until the entire inner surface of this part of the mold is coated with the clay, and its part of the jar perfectly formed, the air which was chambered by the sheet of clay placed across the mouth of the mold and then depressed, as has been described, escaping by the vent (c). Leaving this part of the mold remaining in its place in the recess in the disk, the operator now takes part (1) which had just been laid aside and places it appropriately upon part (2), the uniting surfaces of the two parts coming together concentrically by the V shaped projection upon the uniting surface of part (1) entering the corresponding recess in the uniting surface of part (2), and the plastic clay formed into a lining sheet upon the inner faces of the two parts of the mold, and which had been allowed by the operator to project out slightly beyond the line of the respective uniting surfaces, now unites, the clay contained in part (1) with the clay contained in part (2), the plastic clay yielding and giving way to the amount of any little excess that may have been allowed to stand out beyond the line of the uniting surfaces of the parts of the molds as has been mentioned. That portion of this excess of clay which escapes outwardly enters the annular V shaped recess d near the inner edge of the uniting surface of part (1) without lodging between the uniting surfaces of the parts and thus preventing them from uniting together closely. The operator now takes a small rod, having a sponge saturated with water secured to one end, and introduces the sponge through the opening (f) in the upper end of the now entire mold and into the interior of the jar contained therein and holds it upon the seam formed by the uniting of the plastic clay of the two parts of the jar, the disk is now put in motion carrying the mold, and the operator carefully controlling the rod with its sponge attached, reduces the seam to a uniform surface with the adjacent inner face of the jar, imparting to it a perfect interior finish. The entire mold is now removed from the disk and with its contained jar is placed in the "hot room" until the water shall have been absorbed from the plastic clay composing the jar, by the plaster mold. In the meantime the operator proceeds with other divided molds by the same process that has been described, until at the end of from four to six hours, the jars which had been first formed or molded will have become sufficiently dry and firm to sustain their own weight independently. The jar within the mold will have contracted somewhat in drying, and the operator now taking the mold in his hands carefully separates the parts, that is part (1) from part (2) releasing the perfectly formed jar from the mold and, disposing of it properly, it is permitted to remain undisturbed until sufficiently dry to be ready for the subsequent processes of burning and glazing. Before which, however a thin fin which may possibly appear around the outer surface of the jar, where the two parts of the mold united must be carefully removed with some sharp tool. The molds which have thus been disengaged are now ready for use a second time the same as before and so on from time to time without special limit, the molds sustaining no material injury by continued careful use.

In the ordinary process of molding jars, the molds are made in four parts, the body of the jar consisting of two parts, dividing vertically, the bottom of one and the top of one. Each part is separately taken and its inner surface corresponding with the outer surface of the jar, is lined with a sheet of clay applied with the hand of the operator and as evenly as possible, next the parts are united and the respective joining seams of the plastic clay are leveled down and the interior surface rendered as smooth and even as possible by the operator, using the tummy stick, or rod and sponge which has been described, working by a slow and laborious process through the comparatively small opening in the top of the four part mold and the corresponding opening in the top of the contained vessel. The molds are not adapted to be used upon the throwing wheel or lathe, and this machine is not employed in any part of the process.

I have described my invention as relating to two part molds. It may however be necessary in some instances to produce jars having a rim around their top or an enlarged base around the bottom, or having some other peculiar feature which would render it impossible to liberate a whole jar from a two part mold, that is when the plane of division of the two parts is transverse to the axis, as has been explained with reference to parts (1) and (2) of the mold herein described. In such cases the two parts (1) and (2) or either of them may be divided vertically and at right angles with the plane upon which they divide one from the other, into two or more minor parts or subdivisions, and these minor parts by separating laterally will permit the jar when sufficiently dry, to be removed from the mold without injury. These minor parts which together constitute either one of the two main parts such as has been described, may be bound and retained together by a cord or band except when required to be separated for the purpose of removing a jar from the mold. So that for all the purposes of molding and in all the processes herein explained except the single and supplementary one of releasing the perfectly formed jar from the mold, the minor parts constituting either one of the two principal parts are bound together into one part, and the principal part thus formed is treated and used in all respects precisely as though it were not subdivided into two or more minor parts. Hence in describing my invention as relating to two part molds I desire to be understood as referring to molds for molding jars which in their adaptation to be used with the potters' lathe as described, and for all the essential purposes of molding are used and treated as consisting of two parts.

My improvement is only applicable to molding jars whose inner surface is wholly or mainly circular.

Having described my invention what I claim as new and desire to secure by Letters Patent is—

A two part mold for molding jars when the parts 1 and 2 thereof are made and adapted to be used with a potter's lathe in the manner substantially as herein described.

GEORGE SCOTT.

Witnesses:
WM. CLOUGH,
CHARLES L. FISHER.